(12) United States Patent
Waggoner et al.

(10) Patent No.: US 10,313,759 B1
(45) Date of Patent: *Jun. 4, 2019

(54) ENABLING PLAYBACK AND REQUEST OF PARTIAL MEDIA FRAGMENTS

(71) Applicant: Amazon Technologies, Inc., Seattle, WA (US)

(72) Inventors: Charles Benjamin Franklin Waggoner, Portland, OR (US); Marc Joliveau, Seattle, WA (US); Lauri Juhani Särkkä, London (GB)

(73) Assignee: Amazon Technologies, Inc., Seattle, WA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/194,341

(22) Filed: Jun. 27, 2016

(51) Int. Cl.
| | |
|---|---|
| H04N 21/234 | (2011.01) |
| H04N 21/472 | (2011.01) |
| H04L 29/06 | (2006.01) |
| H04N 21/2387 | (2011.01) |
| H04N 21/44 | (2011.01) |
| H04N 21/41 | (2011.01) |
| H04N 21/442 | (2011.01) |
| H04N 21/24 | (2011.01) |

(52) U.S. Cl.
CPC ... *H04N 21/47217* (2013.01); *H04L 65/1003* (2013.01); *H04L 65/4069* (2013.01); *H04L 65/80* (2013.01); *H04L 67/42* (2013.01); *H04N 21/2387* (2013.01); *H04N 21/24* (2013.01); *H04N 21/4126* (2013.01); *H04N 21/442* (2013.01); *H04N 21/44004* (2013.01); *H04N 21/47202* (2013.01)

(58) Field of Classification Search
CPC .......................... H04N 21/44; H04N 21/845
See application file for complete search history.

(56) References Cited

U.S. PATENT DOCUMENTS

| | | | | |
|---|---|---|---|---|
| 2006/0215586 | A1* | 9/2006 | Hiddink | H04L 47/10 370/282 |
| 2007/0209057 | A1* | 9/2007 | Musson | H04H 20/42 725/111 |
| 2011/0082914 | A1 | 4/2011 | Robert et al. | |
| 2011/0296048 | A1* | 12/2011 | Knox | H04L 65/605 709/231 |
| 2012/0030723 | A1* | 2/2012 | Baum | H04N 21/234327 725/105 |
| 2012/0054818 | A1 | 3/2012 | Noh et al. | |
| 2016/0119657 | A1* | 4/2016 | Sun | H04N 21/23406 725/94 |
| 2016/0134915 | A1* | 5/2016 | Oran | H04N 21/2662 725/95 |

(Continued)

OTHER PUBLICATIONS

U.S. Office Action dated Apr. 25, 2018 issued in U.S. Appl. No. 15/194,344.

(Continued)

*Primary Examiner* — Junior O Mendoza
(74) *Attorney, Agent, or Firm* — Weaver Austin Villeneuve & Sampson LLP

(57) ABSTRACT

Techniques are described that enable initiating playback of a media fragment before the entire fragment has been downloaded. Also described are techniques that enable a more granular approach to the way in which a client device requests and plays back media fragments.

15 Claims, 7 Drawing Sheets

(56) References Cited

U.S. PATENT DOCUMENTS

2016/0316233 A1* 10/2016 Ghadi .............. H04N 21/26258
2017/0250881 A1*  8/2017 Kellicker ................ H04L 43/06

OTHER PUBLICATIONS

U.S. Appl. No. 15/194,344, filed Jun. 27, 2016, Waggoner, et al.
U.S. Office Action dated Oct. 5, 2018 issued in U.S. Appl. No. 15/194,344.

* cited by examiner

ENABLING PLAYBACK AND REQUEST OF PARTIAL MEDIA FRAGMENTS

BACKGROUND

The streaming or downloading of digital files has become a dominant mechanism for delivering content to a wide range of devices. Increasing consumer demand for higher and higher quality content poses significant technical challenges for existing infrastructure. Whether the content is video-on-demand (VOD) content or broadcast content (e.g., scheduled content or content being generated and delivered in real time), adaptive bit rate heuristics attempt to balance a number of competing priorities to deliver the highest quality user experience within available bandwidth.

One of the competing priorities affecting the user experience is reducing the likelihood of rebuffering events in which the playback of content freezes or prematurely terminates because the client has an insufficient amount of the content in its download buffer. Manipulating the size of the download buffer (e.g., how many seconds of content must be in the buffer to sustain playback) can decrease the likelihood of rebuffering events but may have an undesirable consequence such as, for example, increasing the time to first frame, i.e., the amount of time that passes before the first frame of the content appears on the display of the client.

The adoption of High Efficiency Video Coding (HEVC), also known as H.265, as a video compression standard promises to enable a significant reduction in storage and bandwidth requirements for a given quality of video content. However, given the expected continued growth in consumer demand and the introduction of higher resolution content, heuristics that attempt to strike an appropriate balance among the various competing priorities to deliver a high quality experience must continue to improve.

DETAILED DESCRIPTION

This disclosure describes techniques that enable initiating playback of a media fragment by a client device before the entire fragment has been downloaded. According to some implementations, this is enabled by considering partially downloaded fragments when deciding whether playback can be initiated or sustained. For example, in contrast with conventional approaches which only account for fully downloaded fragments, playback of the frames of a partially downloaded fragment can be initiated as soon as a buffer threshold is exceeded rather than waiting until the fragment is completely received. This may be particularly important for fragments of increasingly long duration, e.g., fragments that include 10 seconds or more of content. In some cases, playback of content may be sustained (e.g., without rebuffering) even if all of the frames of an incomplete fragment are never received.

Also described are techniques that enable a more granular approach to the way in which a client device requests content. For example, when the downloading of a fragment stops for some reason, this conventionally requires requesting the entire fragment again; even in cases where the fragment was almost entirely received before downloading terminated. By contrast, techniques enabled by the present disclosure enable the client device to request only a part of the fragment that hasn't been received. An example embodying these concepts will be illustrative.

Figure 1:
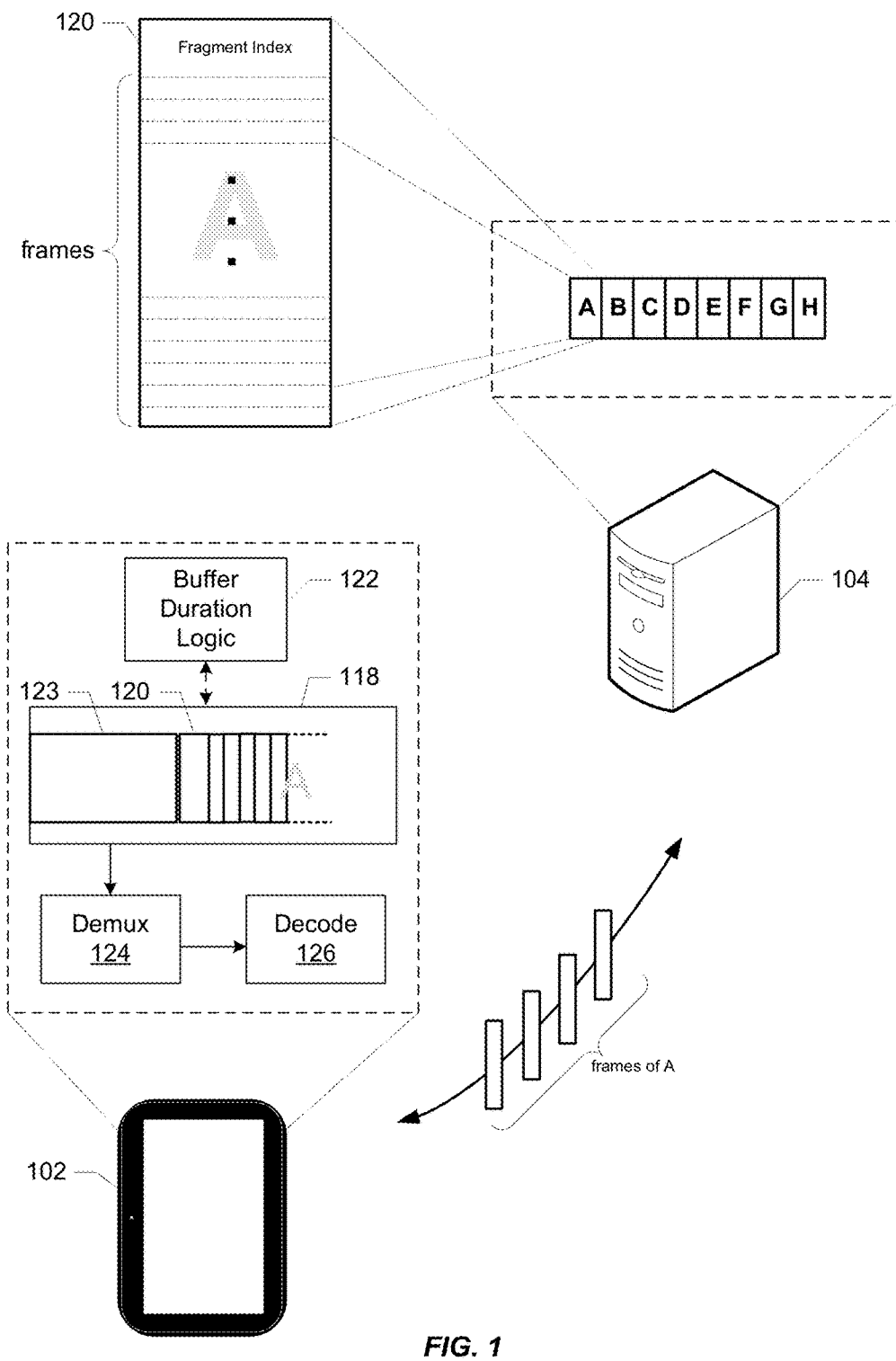
FIG. 1 illustrates the operation of an example of a particular implementation.

In the example illustrated in FIG. 1, a client device 102 is streaming content from an edge server 104 of a content delivery network (CDN). Client device 102 requests video fragments (e.g., fragments A-H) from server 104 in sequence and receives the requested video fragments in a download buffer 118. When client device 102 requests fragment A, it initially receives a fragment index 120 that identifies the frames in the fragment, the reference hierarchy (specifying dependencies between and among frames), and a byte offset for each frame in the fragment. Logic 122 on the client (e.g., in the client's media player) determines the duration of content in buffer 118. This buffer duration includes the durations of any completely downloaded fragments (e.g., fragment 123), as well as a duration associated with the partially downloaded fragment that is currently being received (e.g., the frames of fragment A). The latter may be determined using the fragment index (e.g., index 120) and the number of bytes of the fragment that have been downloaded. As long as the buffer duration exceeds a threshold (which may be lower than the playback duration of an entire fragment), playback of fragment A may be initiated. This involves demultiplexing of the frames of fragment A by demultiplexer 124 which then passes the demultiplexed frames to decoder 126 for decoding. Thus, because the buffer duration determined by logic 122 includes the content from a partially downloaded fragment, playback may be initiated before the entire fragment is downloaded.

Assume in this example that fragment A stops downloading after only a subset of the frames has been received. This might occur, for example, where the available bandwidth drops temporarily to a level that is not sufficient to sustain the connection to server 104. If there is sufficient content in buffer 118 (as determined by logic 122), playback can continue including demultiplexing and decoding of frames from incomplete fragment A. Logic 122 can also send a request to server 104 for some or all of the frames of fragment A that were not received, e.g., as determined using index 120. This "partial rebuffering" allows playback to continue without rebuffering the entirety of fragment A.

Alternatively, logic 122 can attempt playback of the received frames of fragment A without requesting any more of the frames of the fragment. This might be preferable to a partial or complete rebuffering where, for example, subsequent fragments B and C have already been completely received in buffer 118, accompanying audio for frames A-C has been successfully received, and enough of the video frames of fragment A have been received to enable some level of visual playback, albeit at a reduced quality or with other visual artifacts. In some cases, playback of only a subset of the frames of a fragment might involve adjusting the time stamps of the received frames (e.g., in demultiplexer 124) so as to spread presentation of the frames over the original duration of the fragment.

It will be understood that some techniques by which content is requested by client devices involve the use of byte ranges that correspond to fragments of content. For example, in MPEG-DASH (Dynamic Adaptive Streaming over HTTP) content requests involve the request of byte ranges referred to as "MediaRanges." In the context of DASH then, requests for partial fragments as enabled by the present disclosure involve requests for one or more byte ranges within such a MediaRange. Similar analogies to the terminology used in the context of other techniques will be understood by those of skill in the art. The scope of the present disclosure should therefore not be unduly limited where the analogy is understood.

Figure 2:
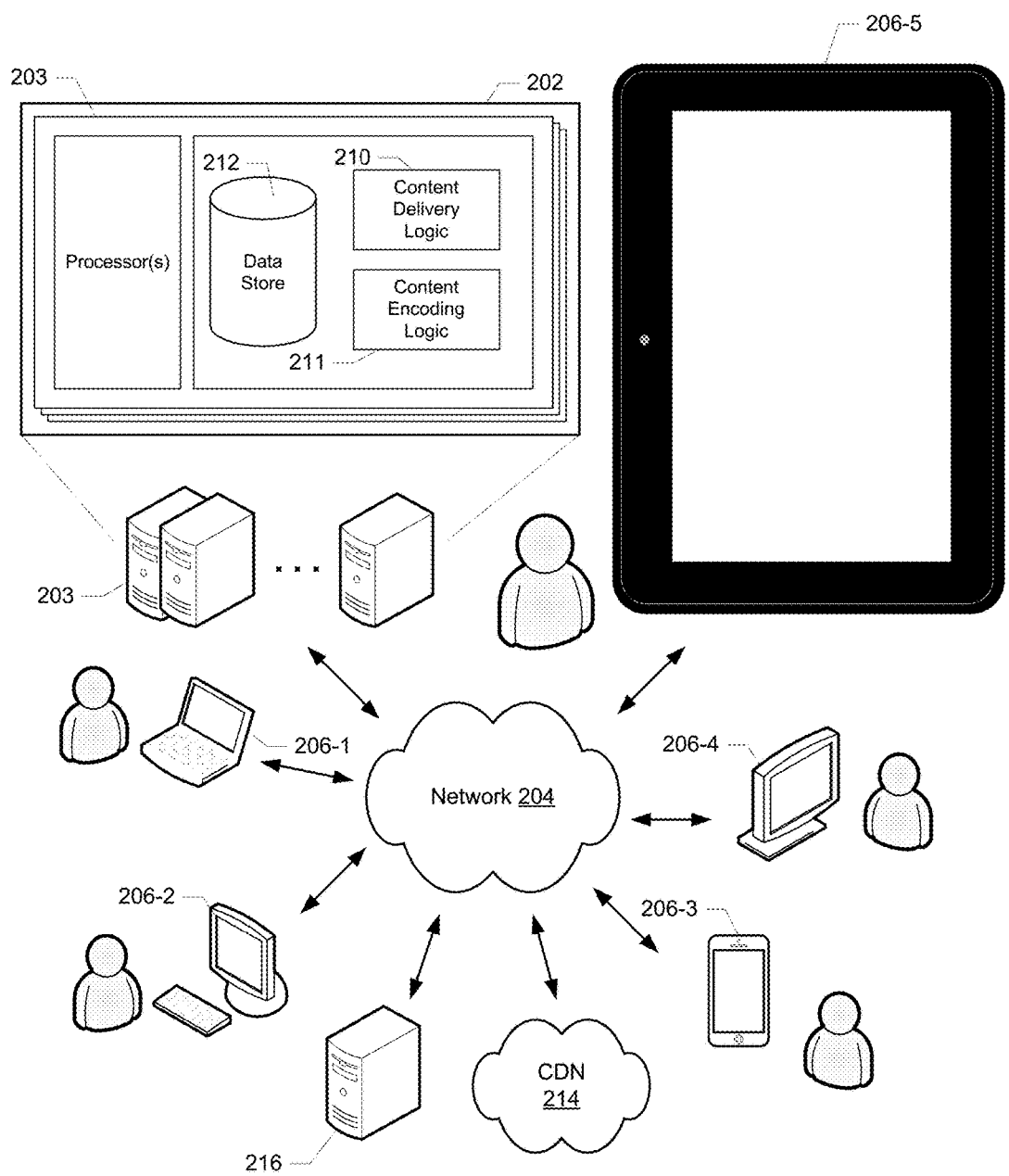
FIG. 2 is a simplified diagram of a computing environment in which various implementations may be practiced.

FIG. 2 illustrates an example of a computing environment in which a video content service 202 provides live streaming content and video-on-demand (VOD) content (e.g., audio or video) via network 204 to a variety of client devices (206-1 through 206-5) in accordance with the techniques described herein. Content service 202 includes content delivery logic 210 which facilitates various aspects of content delivery to client devices 206. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and downloading or consuming streams of live and/or VOD content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches or smart glasses), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it were integrated with the platform(s) that provides the content to client devices.

However, it will be understood that content service 202 may provide access to content in conjunction with one or more content delivery networks (e.g., CDN 214) that may or may not be independent of content service 202. In addition, the source of the content may or may not be independent of content service 202 (e.g., as represented by content provider server 216). The range of variations known to those of skill in the art are contemplated to be within the scope of this disclosure.

Implementations enabled by the present disclosure contemplate logic resident on the client devices consuming content from content service 202; such logic being configured to make decisions in conjunction with consuming the content such as, for example, monitoring the buffer duration of fragments and partial fragments received, and making decisions relating to playback of incomplete fragments, requesting remainder fragments, etc. The logic might be part of an existing algorithm or module on the client device or implemented to work in conjunction with such an algorithm or module. The logic might be implemented, for example, in a media player on the client device, as part of the demultiplexer and/or decoder on the client device, as a browser plug-in, or as a separate application or module resident on the client device.

Implementations are also contemplated in which, in addition to content delivery logic 210 (which facilitates various aspects of content delivery to client devices 206), content service 202 may include logic that facilitates at least some aspects of the delivery of content as described herein (e.g., as represented by content encoding logic 211). For example, such logic, might order the frames in a fragment of content according to frame type rather than in temporal or decode order which, as will be discussed below, can provide benefits with some implementations.

In addition to providing access to content, content service 202 may also include a variety of information related to the content (e.g., associated metadata and manifests in data store 212 to which service 202 provides access. Alternatively, such information about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
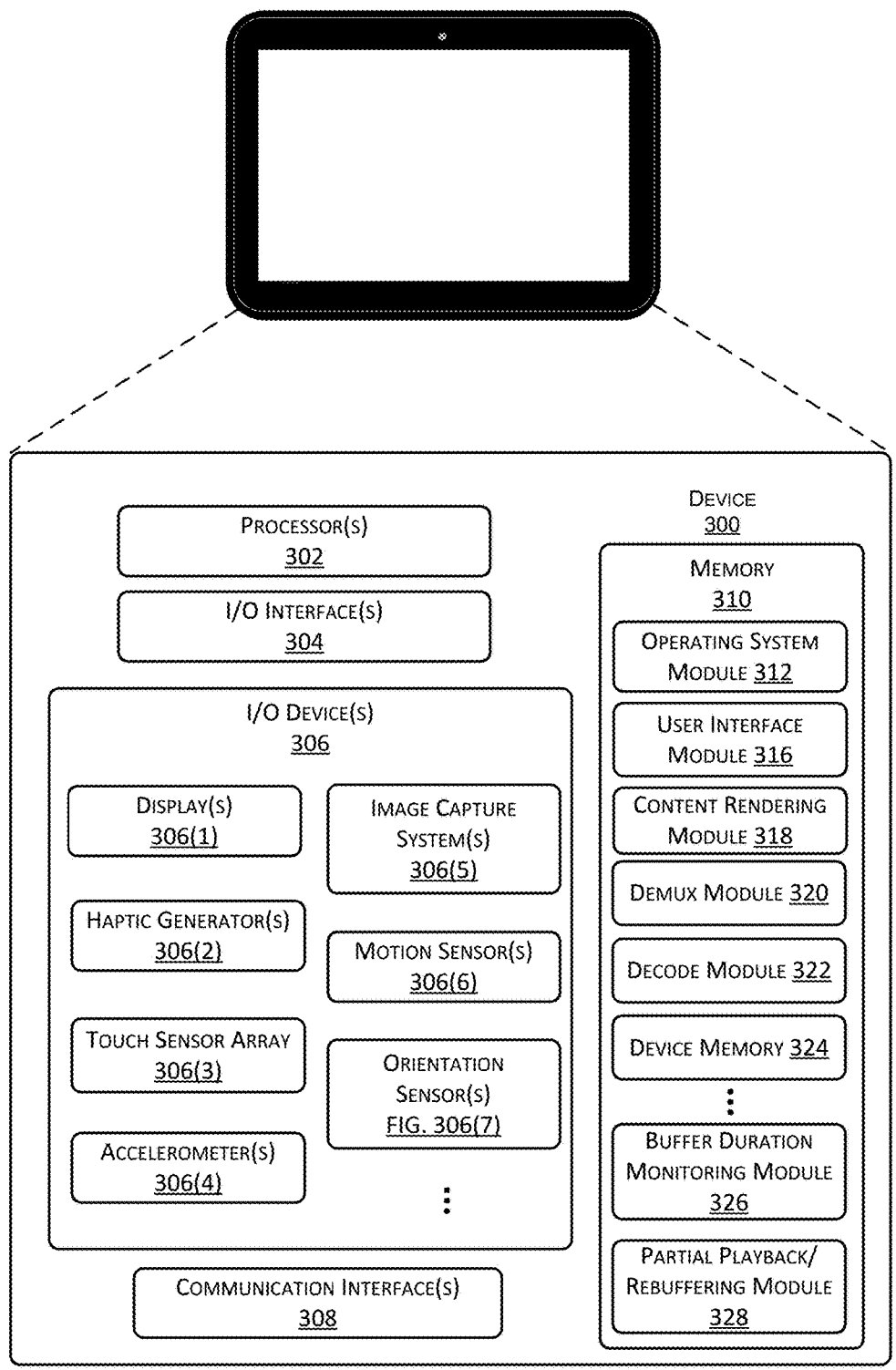
FIG. 3 is a simplified diagram of an example of a client device with which various implementations may be practiced.

A block diagram of an example of a client device 300 suitable for use with various implementations is shown in FIG. 3. Device 300 includes one or more single or multi-core processors 302 configured to execute stored instructions (e.g., in device memory 324). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, a content frame demultiplexing module 320, a content decoding module 322, and other modules. Memory 310 also includes device memory 324 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 324 may be distributed across one or more other devices including servers, network attached storage devices, and so forth.

The logic or computer program instructions used to support the playback and request of partial fragments as described herein (represented by buffer duration tracking module 326 and partial playback/rebuffering module 328) may be implemented in a variety of ways. For example, at least some of this functionality may be implemented as part of the code of a media player, a demultiplexer, and/or a decoder operating on device 300. Alternatively, modules 326 and 328 may be implemented separately from and interact with the device's media player, web browser, mobile app, decoder, etc. The range of possibilities will be understood by those of skill in the art with reference to the following description.

It will also be understood that device 300 of FIG. 3 is merely an example of a device with which various implementations enabled by the present disclosure may be practiced, and that a wide variety of other devices types may also be used (e.g., as represented by devices 206-1 to 206-5). The scope of this disclosure should therefore not be limited by reference to device-specific details.

Figure 4:
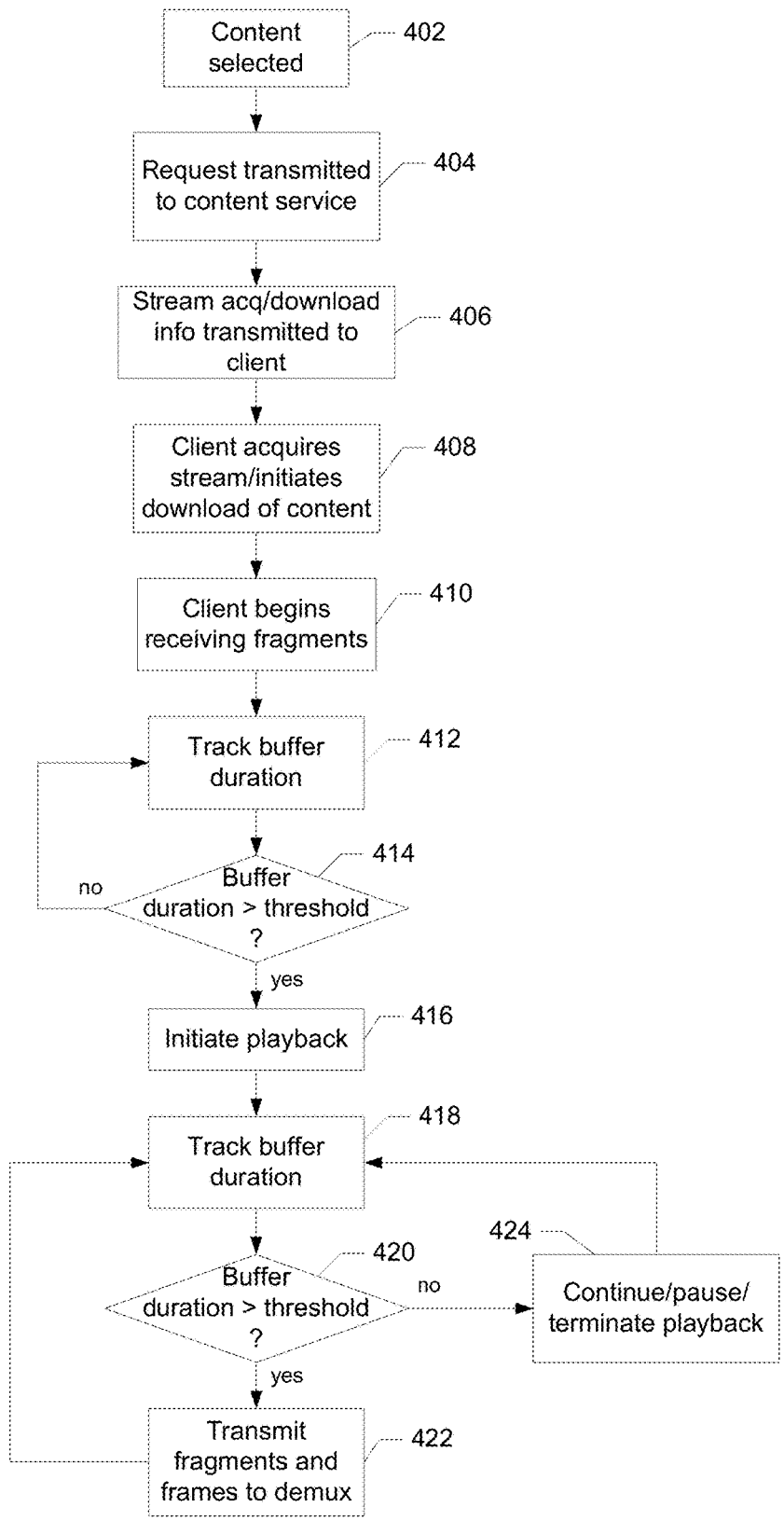
FIG. 4 is a flowchart illustrating operation of a particular implementation.

The delivery of content to a client device according to a particular implementation is illustrated in the flow chart of FIG. 4. As will be understood, the content may be live streaming content or VOD content. Further, this and other examples described herein assume the use of H.265 encoding (also commonly referred to as HEVC) for video content. However, it will be understood that the basic principles described herein may be employed with any of a variety of video and audio codecs including, for example, MPEG-1, MPEG-2, MPEG-4 Part 2, VC-1, H.263, VP8, VP9, VP10, Daala, and H.264.

When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Content may be delivered in an encrypted stream using any of a variety of encryption technologies including, for example, various Advanced Encryption Standard (AES) and Elliptic Curve Cryptography (ECC) encryption techniques. The content may also be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 4, when content is selected in a user interface on a client device (402), a request for the content is sent to the corresponding content service (404). The content service provides the client device with the information the client device needs to acquire a stream of the content or to download the content (406). This may include, for example, one or more DRM licenses, a decryption key, content metadata, and information about where the client can request the fragments of the selected content at various resolutions (e.g., a manifest). The client device then initiates acquisition of the content using the information received from the content service (408).

As the client device begins receiving fragments (410) it keeps track of the buffer duration of the received fragments (412) (e.g., using module 326). When there is a sufficiently long buffer duration (414), playback of the content is initiated (416), involving demultiplexing, decoding, and rendering of the content (e.g., using modules 318, 320, and 322). While playback is ongoing, the client device continues tracking the buffer duration of received fragments (including both complete and partially received fragments) (418). As long as the buffer duration remains above a threshold (420), fragments in the download buffer, including the frames of the partially received fragment, are transmitted to the demultiplexer for initiation of playback (422). If the buffer duration falls below the threshold (420), a variety of actions relating to continuing, pausing, or even terminating playback may be taken (424). Some examples of these actions are described below.

Including partially downloaded fragments in the determination of buffer duration, and initiating playback of partially downloaded fragments allow for delaying decisions as to whether to rebuffer or terminate playback relative to conventional approaches, allowing more data to arrive and potentially sustaining playback without having to do either. That is, because the buffer duration that may trigger such actions includes the partially downloaded fragment currently being received (and may in some cases be set lower than the fragment duration), the decisions to trigger such actions can be made in a more precise and flexible way as compared to conventional techniques.

Including a partially received fragment in a tracked buffer duration and/or initiating playback of a partially received fragment, enable a range of decision-making in connection with the playback of the content. This might include, for example, using the buffer duration as input to an adaptive bitrate heuristic, determining whether to play back an incomplete fragment even if the remainder of the fragment will not be received, determining whether to request a remainder portion of an incomplete fragment, determining whether to generate another request for the entirety of an incomplete fragment (at the same or a different bit rate or quality level), and/or determining whether to terminate or pause playback, to name a few representative examples.

It should also be noted that the threshold used for determining whether to initiate playback of the content at the beginning of a session and the threshold(s) used for each of the other decisions mentioned above may be different. For example, the buffer duration tracked to initiate playback (e.g., 412) may be considerably longer than that used to determine whether playback of an incomplete fragment can be sustained (e.g., 418). The former might be selected based on a "time to first frame" constraint, or a requirement that playback does not begin until some number of seconds or even minutes of content have been received. By contrast, the latter might be selected based on other considerations such as, for example, the likelihood of rebuffering, available bandwidth, etc.

According to some implementations and as mentioned above, a threshold to which the buffer duration of received fragments is compared might be set lower than the buffer duration of a complete fragment. This might be useful, for example, in cases where the fragment duration is long (e.g., 15 seconds or more), but the specified time to first frame (i.e., the time that passes between selection of the content and display of the first frame of the content on a client device) is less than 10 seconds. As will be appreciated, having a threshold set lower than the fragment duration might be appropriate where, for example, the average available bandwidth is high and the risk of rebuffering correspondingly low.

Figure 5:
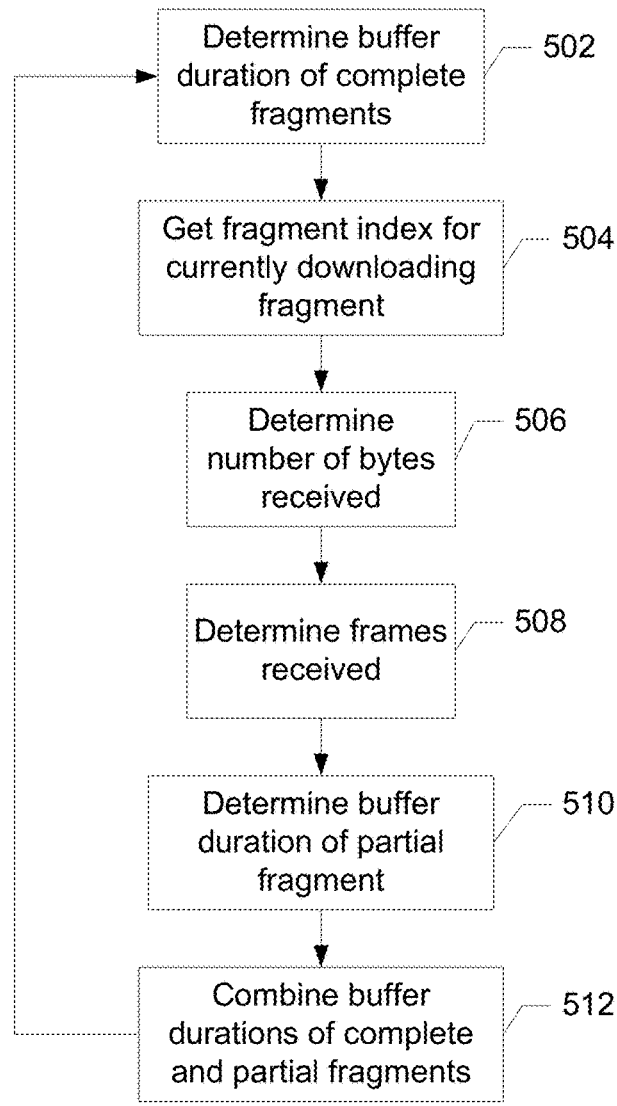
FIG. 5 is a flowchart illustrating determination of buffer duration according to a particular implementation.

In addition, the manner in which buffer duration is determined may differ as between the different scenarios described above. For example, when determining whether enough content has been received to initiate playback of the content at the beginning of a session, the client device might use a conventional approach and only consider fragments that have been completely received. By contrast, to support decision making once playback has begun, partially received fragments may be considered in the buffer duration as enabled by the present disclosure. Alternatively, both buffer durations might include partially received fragments. FIG. 5 illustrates an example of how to determine buffer duration to account for partially received fragments.

The client device (e.g., using module 326) determines the buffer duration of any complete fragments that have been received (502). Where the fragment duration is the same for each complete fragment, this may be done simply by maintaining a count of fragments in the client's download buffer. Alternatively, this information may be determined from the metadata associated with each fragment. The buffer duration of complete fragments may also include the durations of complete fragments that are currently being processed by the demultiplexer and/or the decoder (e.g., as determined from buffers associated with each).

For the fragment that is currently being downloaded, the client device uses the fragment's index to determine the buffer duration of the portion of the fragment that has been received. That is, each fragment (also referred to as a group of pictures or GOP) starts with an index that identifies the frames of the fragment, the reference hierarchy (i.e., representing the dependencies between or among frames), and the offset of each frame in the file. For example, this index is in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

Based on the fragment index (504) and the number of bytes of the fragment received (506), the client device can determine the frames available for playback (508) and the contribution to the buffer duration attributable to those frames (510). This may be done by counting the number of frames received, counting the number of decodable or playable frames, or using the time stamp of the most recently received frame that is decodable or playable. Again, the determination of buffer duration is not limited to the data received in the download buffer, but may account for data being processed in the demultiplexing and/or decoding pipelines that has not yet been displayed. The buffer duration of the currently downloading fragment is added to the buffer duration of any complete fragments (512) for use as in decision making as described above with reference to the example illustrated in FIG. 4 and below. The process iterates as fragments continue to be received and played back. As will be appreciated, using this approach, buffer duration can be tracked and updated at a more granular level (and thus more frequently) than conventional approaches that rely on counting only completely downloaded fragments.

According to various implementations, the buffer duration attributable to the frames of a partially received fragment (e.g., as determined in 510) may vary. For example, the buffer duration attributable to such frames might be determined based on the most recent frame received that is decodable, i.e., as long the frame and all of the frames that frame references have been received it can be included in the buffer duration. For fragments in which the frames are packed in decode order, the duration may then be determined by counting the number of frames received, or from the time stamp of the last frame received. Alternatively, if the frames are packed in some other order, in tier order by frame type, in playback order, etc., there may be frames received that are not yet decodable and so are not included in the buffer duration.

It should also be noted that frames that cannot be timely decoded and played back may be excluded from the buffer duration. That is, it may be determined based on the time stamp of the frame at the current playhead (i.e., the frame currently being displayed), the latency between sending a frame to the decoder and displaying the frame (e.g., typically around 400 ms for some devices), and the time stamp of a decodable frame whether that decodable frame can be sent to the decoder in time to be useful, i.e., to be played back or used as a reference frame. Frames that do not meet this criterion would not be included in the buffer duration. Nor would such frames be sent to the decoder, e.g., a frame with a reference to a future frame would not be sent to the decoder if it is determined that the future frame has not or will not be received in time to decode the first frame for playback.

Figure 6:
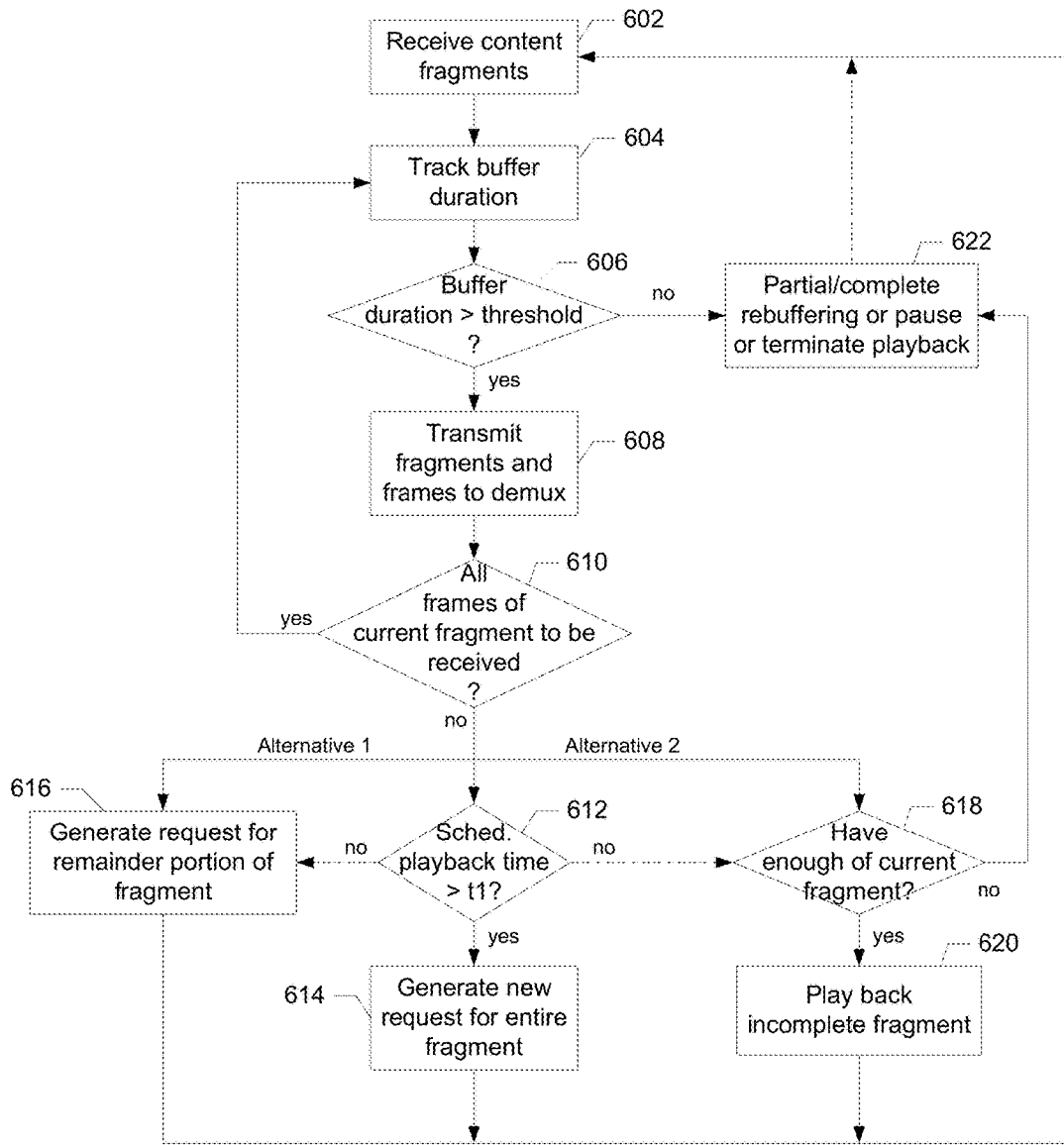
FIG. 6 is a flowchart illustrating operation of another particular implementation.

Examples of decision making that may be associated with use of a buffer duration that includes partially received fragments and/or in conjunction with playback of partial fragments are illustrated in FIG. 6. As content fragments are received by a client device (602), a buffer duration is tracked (604). As discussed above with reference to FIGS. 4 and 5, this buffer duration may account for partially received or downloaded fragments. As long as the buffer duration exceeds a threshold (606), fragments in the download buffer, including the frames of a partially downloaded fragment, are transmitted to the demultiplexer for initiation of playback (608).

If the buffer duration exceeds the threshold but the client device (e.g., partial playback/rebuffer module 328) determines that not all of the frames of a currently downloading fragment will be received (610), e.g., because downloading of the fragment has terminated or otherwise failed, the client device (e.g., module 328) may be configured to make a variety of decisions depending on the circumstances. For example, if the time at which the incomplete fragment will be needed for playback is sufficiently far out in the future such that playback will not be interrupted (612), e.g., as determined from the current value of the buffer duration, available bandwidth, network conditions, the current client playhead, etc., a new request for the entirety of the incomplete fragment may be generated (614), e.g., like a conventional rebuffering. In some cases, the new request may be for the entire fragment but at a lower bit rate. This might be triggered where, for example, there is not enough time to request the higher bit rate version of the fragment.

Alternatively, a request for only a remainder portion of the incomplete fragment may be generated (616), i.e., a "partial rebuffering." Such a request might be generated instead of a request for the entire fragment as shown in FIG. 6 (Alternative 1). In other cases, the request for the remainder portion of the incomplete fragment might be generated in response to a determination that, while there isn't sufficient time to request and download the entire fragment (the dashed line from 612), there is sufficient time to request and download the remainder portion. Suitable variations on this theme will be understood by those of skill in the art.

As discussed below, the remainder portion of the incomplete fragment that is the subject of such a request may be determined using the fragment index and the frames of the fragment that were successfully received (e.g., similar to the determination of buffer duration described above). In some cases, the request for remainder portion of the incomplete fragment will specify the byte range(s) that represent all of the frames of the fragment that have not been successfully received. However, in some cases, only a subset of that byte range might be requested. For example, if playback of the last successfully received decodable frame of the incomplete fragment is scheduled at a point in the future that is longer than the latency associated with the request for the remainder portion of the incomplete fragment, the request could be for a byte range that only includes frames that are at least that length of time after that last frame in the playback sequence. Other variations on the frames and/or byte range(s) that can be the subject of a partial rebuffering request are described below.

Referring again to FIG. 6, and still assuming that the tracked buffer duration exceeds the threshold (606), the client device (e.g., module 328) may, as yet another alternative to requesting the entirety or a remainder portion of an incomplete fragment (Alternative 2), determine that it has a sufficient portion of the incomplete fragment (618) to attempt playback of the successfully received frames without requesting any further parts of the fragment (620). This decision might be predicated on the determination that there isn't sufficient time to request the entire fragment (or some portion of the fragment) (the dashed line from 612). Such a decision might also be based on other factors such as, for example, network conditions, available bandwidth or computing resources, or the fact that one or more complete fragments have already been successfully received that are subsequent to the incomplete fragment in the playback sequence. In some implementations, the playback of the incomplete fragment is not predicated on determining whether a sufficient portion of the incomplete fragment has been received, i.e., 618 would be eliminated. In either case, playback of the incomplete fragment might be of poor quality and/or be characterized with various types of visual artifacts, but acceptable visual quality is expected to resume with playback of subsequent complete fragments and may be a desirable alternative to a rebuffering event or termination of playback.

The determination as to whether the client device has a sufficient portion of the fragment to initiate playback (e.g., 618) may be done in a variety of ways. For example, the determination may simply be based on how much of the fragment has been successfully received, e.g., if more than some percentage (e.g., 50% or more) of the fragment has been received. Alternatively, more sophisticated analyses may be applied to ensure an acceptable level of playback quality. For example, the frame types of the successfully received frames (and/or the dependencies among them) may be considered.

Each of the frames of a fragment of an H.264 or H.265 encoded stream may be categorized as one of several frame types, with the frame type defining the kind of dependency allowed for that frame. In general, dependencies between frames are used to support data compression. An Instantaneous Decoder Refresh (IDR or I) frame is the first frame of a fragment and does not depend on other frames, i.e., it can be decoded without reference to another frame. An I frame resets the decoder. Non-IDR independent (i) frames are similar to an I frame in they don't reference other frames. However, i frames (which are comparatively rare) don't reset the decoder like an I frame. Predictive (P) frames can reference I, i, or P frames, but not B or b frames (defined below). If a P frame fails to decode, generally no more frames can be played for the rest of the fragment. Reference bidirectional (B) frames can reference a prior I frame (i.e., the one that begins the same fragment), and prior or subsequent i, P, or B frames, but not b frames. If a B frame fails to decode, generally no more frames can be played until the next P (or in some cases B) frame in the fragment is decoded, i.e., if a B frame is dropped playback can be resumed at a subsequent P (or B) frame. Non-reference bidirectional (b) frames can reference any prior or subsequent frame of any type other than another b frame, i.e., no other frame types reference b frames. Failure to decode a b frame has no impact on playback of future frames. Typically more than half of the frames of a fragment are b frames.

Referring back to the example of FIG. 6, the determination as to whether the client device has a sufficient portion of the fragment to initiate playback (e.g., 618) may involve determining how many of the frames of the fragment of a particular frame type have been successfully received. For example, if most or all of the I/i and P frames have been received, playback of the fragment may be achieved with an acceptable level of visual artifacts. According to a one class of implementations, the frames of a fragment may be packed at the server side (e.g., by content encoding logic 211) and downloaded by the client in tier order rather than decode order, i.e., grouping frames in chunks of the same frame type, e.g., all of the I/i frames, then all of the P frames, etc. As a result, an incomplete fragment on the client device is more likely to include the more important frames of the fragment, i.e., because the frames of the incomplete fragment are ordered by I/i frames, then P frames, then B frames, etc.

According to an even more specific implementation, the playback of an incomplete fragment (e.g., 620) involves the adjustment of the time stamps associated with successfully received frames (e.g., by demultiplexing module 320) such that they are temporally distributed over all or some suitable portion of the playback of the original frame in a way that attempts to smooth out the visual artifacts resulting from the fragment being incomplete. This might be particularly effective in cases in which the frames of a fragment are arranged in tier order in that it supports providing visual information for all or at least some of the playback of the incomplete fragment (albeit with visual artifacts) rather than having the screen go black for several seconds.

Referring once again to FIG. 6, if the tracked buffer duration drops below the threshold (606), or the client device determines that it doesn't have enough of the incomplete fragment to play it back (618), the client device may trigger a full or partial rebuffering (e.g., 616) of the incomplete fragment or pause or terminate playback (622), e.g., depending on how far out into the future that playback of the incomplete fragment is scheduled and/or how far below the threshold the buffer duration has fallen. As will be appreciated, such events may be accompanied by the kind of disruption in the content playback associated with convention rebuffering events. However, it will be understood that the ability to track how much content has been received in a granular way, to initiate playback of partial fragments, and to generate "partial rebuffering" requests as enabled by the present disclosure significantly reduces the likelihood of these kinds of events.

The decisions as to whether to request the same fragment, request the fragment at lower bit rate, request a partial fragment, or attempt play back of the incomplete fragment may involve the use of logic (e.g., module 328 of FIG. 3) that attempt to minimize the risk of playback interruption. As discussed above, inputs to this logic may include, but are not limited to, the current playhead, the latency of generating a request for content (whether the same, a lower bit rate, and/or a partial fragment), the latency involved with decoding and playing a fragment, and the buffer duration (including full and partial fragments). Various implementations may also inform this risk assessment using any of a variety of information that may be available to the client device. Such information might include, for example, network conditions, available bandwidth, available computing resources, or the likelihood (or knowledge) that a fragment (at the same or a different bit rate) is cached nearby.

Figure 7:
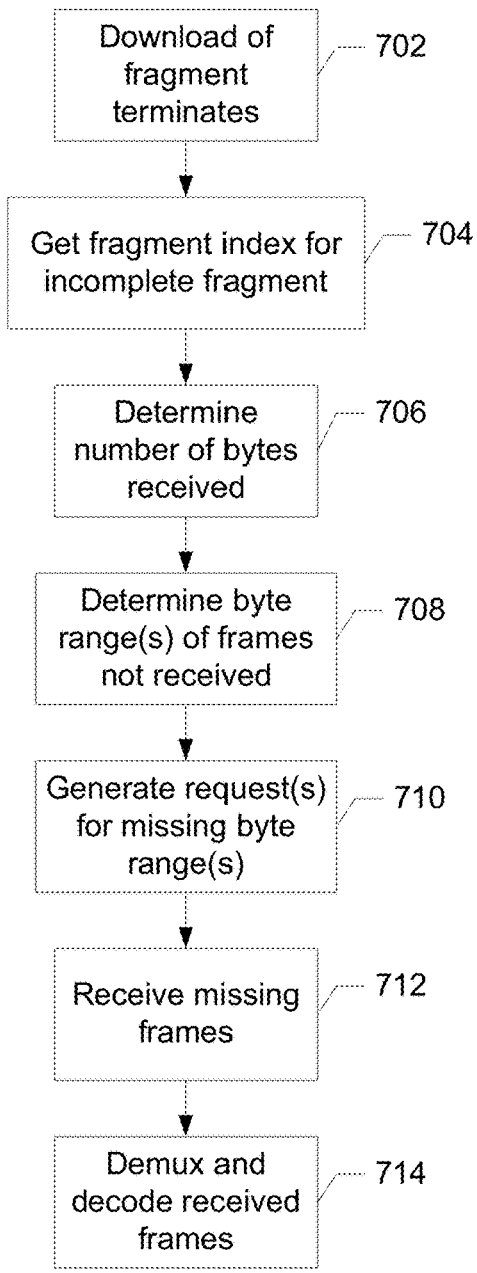
FIG. 7 is a flowchart illustrating operation of an implementation in which downloading of a fragment terminates before the fragment is completely received.

FIG. 7 is a flowchart illustrating operation of an implementation in which downloading of a fragment terminates before the fragment is completely received and a "partial rebuffering" of the incomplete fragment is performed. As mentioned above, the conventional approach to such an event is to generate a new request for the entire fragment, i.e., conventional rebuffering, potentially causing playback to pause or terminate. By contrast, as shown in FIG. 7, when the client device (e.g., module 328) determines that the downloading of a fragment has terminated prematurely (702), it identifies the frames of the fragment that were not successfully received before downloading of the fragment terminated. That is, based on the byte offsets in the fragment index (704) and the number of bytes of the fragment received (706), the client device determines the byte range(s) of the frames that have not been received (708). One or more requests are then generated for all or some part of the byte range(s) of the incomplete fragment that were not successfully received, i.e., the remainder portion of the fragment (710). When the frames of the remainder portion of the fragment are received (712), they may be demultiplexed and decoded in conjunction with the frames of the fragment that were previously received (714).

As discussed above, the request for remainder portion of the incomplete fragment may specify one or more byte ranges that represents all of the frames of the fragment that have not been successfully received. However, in some cases, only a subset of the one or more byte ranges might be requested, e.g., byte range(s) that only includes frames that are at least some length of time after the most recent decodable frame that was successfully received (e.g., to account for the latency associated with the request and/or the decoding pipeline). Other variations on the byte range(s) that can be the subject of such a partial fragment request are also contemplated.

For example, in implementations in which the frames of a fragment are packed at the server side in tier order (e.g., by logic 211), the partial fragment request might specify one or more byte ranges that correspond to one or more types of frames. That is, because the frames are arranged in a fragment according to frame type, the client device can use the frame index to identify the byte range corresponding to frames of a particular type. The request could then be generated to request the byte range(s) associated with specific frame types. For example, if only the I/i frames and some of the P frames were received before downloading terminated, the client could request only the remaining P frames and B frames (taking into account the request latency and what could plausibly be played back), but excluding the b frames. As described above, this might be done in a situation in which the decision is made to proceed with playback of the incomplete fragment without downloading the entire fragment.

More generally, using the information in a fragment index as described herein enables a more granular approach to downloading and playback of fragments as compared to conventional approaches that only allow requesting and downloading of complete fragments. And while, in some contexts, there may be efficiencies associated with downloading byte ranges encompassing many frames, or requesting only a single contiguous range, implementations are contemplated in which multiple and/or non-contiguous ranges might be requested. Implementations are also contemplated in which a requested range might correspond to a single frame.

It should also be noted that implementations are contemplated in which the information that enables a more granular approach to downloading and playback of fragments is not limited to the information found in fragment indexes. That is, implementations are contemplated in which byte offsets for individual frames or sets of frames within a fragment are included in the manifest file or another metadata file associated with a larger portion of the presentation than the individual fragment. Such an approach could enable a more proactive heuristic in that the byte offset information for the entire presentation or some larger portion of the presentation could be used to constrain the initial requests for content (e.g., based on time and/or bandwidth constraints) to specific sub-fragment byte ranges, e.g., as opposed to attempting to download a fragment and then using the fragment index to determine what portion of the fragment wasn't received.

As described above, such capabilities may be useful in the context of implementations that enable the playback and request of incomplete fragments. However, other use cases are contemplated. For example, the ability to download one or more specific byte ranges within a fragment could enable a "seek" or "resume" function that supports playback from an I-frame within a fragment without requiring downloading the frames of the fragment before the I-frame. In another example, the ability to request a specific byte range within a fragment could support handling the corruption in that a byte range of corrupted content within a fragment could be replaced with a corresponding byte range from a fragment of a different bit rate or quality level. In another example, the ability to request byte ranges within fragments could be used as in conjunction with a bit rate heuristic as an optimization, enabling more granular selection of content at different bit rates or quality levels.

Implementations are also contemplated in which a more granular approach to downloading and playback of fragments is enabled without requiring the tracking or use of a buffer duration as a condition precedent to initiating the playback of frames. That is, as long as a frame is decodable (i.e., the frame and all of the frames that it references have been received) it is transmitted to the demultiplexer regardless of how much content has been received under the premise that playback should continue until the device runs out of frames. If the device runs out of frames, playback can be paused at the last playable frame of the current partial fragment pending a request for some remainder portion of the fragment (as described above) or until enough of the next fragment is received to resume playback.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-program product, comprising one or more non-transitory computer-readable media having computer program instructions stored therein, the computer program instructions being configured such that, when executed by one or more computing devices, the computer program instructions cause the one or more computing devices to:

transmit a request for a video presentation, the video presentation including a plurality of video fragments;

receive a manifest configured to enable the one or more computing devices to request video fragments in the plurality of video fragments;

generate a first request for a video fragment of the video presentation using the manifest associated with the video presentation, the video fragment including a plurality of video frames and a fragment index, the fragment index identifying each of the video frames of the video fragment and including a byte offset for each of the video frames;

transmit the first request to a remote platform specified by the manifest, the remote platform hosting the plurality of fragments of the video presentation;

receive a first portion of the video fragment from the remote platform, the first portion of the video fragment including the fragment index and fewer than all of the video frames of the video fragment;

initiate playback of the video frames of the first portion of the video fragment at the one or more computing devices before the video fragment is completely downloaded to the one or more computing devices;

determine that downloading of the video fragment has terminated without the video fragment being completely downloaded;

identify video frames of the video fragment not included in the first portion of the video fragment using the fragment index;

generate a second request for a remainder portion of the video fragment, the remainder portion of the video fragment including at least some of the video frames of the video fragment not included in the first portion of the video fragment, the request specifying one or more byte ranges corresponding to the video frames of the remainder portion of the video fragment, the one or more byte ranges being derived using one or more of the byte offsets in the fragment index;

transmit the second request to the remote platform;

receive at least some of the video frames of the remainder portion of the video fragment while playback of the video frames of the first portion of the video fragment is ongoing; and initiate playback of the video frames of the remainder portion of the video fragment at the one or more computing devices after playback of the video frames of the first portion of the video fragment terminates and without rebuffering all of the video fragment.

2. The computer program product of claim 1, the computer program instructions being further configured to cause the one or more computing devices to:

track a buffer duration of the video presentation that has been downloaded, the buffer duration representing at least some of the first portion of the video fragment; and initiate playback of the video frames of the first portion of the video fragment only where the buffer duration exceeds a threshold.

3. The computer program product of claim 1, wherein each of the video frames of the video fragment corresponds to one of a plurality of frame types, each of the frame types being characterized by a set of frame dependencies, the plurality of frame types being characterized by a hierarchy of the frame types, and wherein the video frames of the video fragment are grouped within the video fragment according to the frame types and ordered within the video fragment according to the hierarchy of the frame types, and wherein the video frames of the remainder portion of the video fragment do not include one or more of the frame types.

4. A computer-implemented method, comprising:
transmitting, by a client device, a request for media content, the media content including a plurality of media fragments;
receiving, by the client device, manifest data configured to enable the client device to request the media fragments;
transmitting, by the client device, a request for a media fragment, the media fragment including a plurality of frames;
receiving, by the client device, a portion of the media fragment, the portion of the media fragment including fewer than all of the frames of the media fragment;
tracking a received playback duration of the media content, the received playback duration of the media content including a first playback duration corresponding to the portion of the media fragment, the first playback duration being determined using a fragment index associated with the media fragment and a number of bytes for the portion of the media fragment, wherein the fragment index identifies frames, a reference hierarchy, and frame offsets for the media fragment;
determining that the received playback duration exceeds a threshold;
responsive to determining that the received playback duration exceeds a threshold, initiating, by the client device, playback of the frames of the portion of the media fragment without the media fragment being completely downloaded by the client device;
determining, by the client device, that downloading of the media fragment has terminated without the media fragment being completely downloaded;
identifying, by the client device, frames of the media fragment not included in the portion of the media fragment; and
transmitting, by the client device, a second request specifying a remainder portion of the media fragment that is less than the entire media fragment, the remainder portion of the media fragment including at least some of the frames of the media fragment identified as not being included in the portion of the media fragment.

5. The method of claim 4 wherein the media fragment is characterized by a fragment duration, and wherein the threshold is below the fragment duration of the media fragment.

6. The method of claim 4, wherein tracking the received playback duration of the media content includes monitoring one or more of a download buffer associated with a media player, an internal buffer of a demultiplexer associated with the media player, or an internal buffer of a decoder associated with the media player.

7. The method of claim 4, further comprising:
determining that downloading of the remainder portion of the media fragment has terminated without being completely downloaded;
proceeding with playback of the media fragment using only the frames of the portion of the media fragment; and
proceeding with playback of one or more subsequent media fragments after playback of the media fragment and without rebuffering the media fragment.

8. The method of claim 7, wherein each of the frames of the media fragment corresponds to one of a plurality of frame types, each of the frame types being characterized by a set of frame dependencies, the plurality of frame types being characterized by a hierarchy of the frame types, and wherein the frames of the media fragment are grouped within the media fragment according to the frame types and ordered within the media fragment according to the hierarchy of the frame types, and wherein the frames of the portion of the media fragment do not include one or more of the frame types.

9. The method of claim 7, further comprising modifying time stamps associated with at least some of the frames of the portion of the media fragment to smooth out a temporal distribution of the frames of the portion of the media fragment during playback.

10. A client device, comprising:
memory; and
one or more processors configured, in conjunction with the memory, to:
transmit, by the client device, a request for media content, the media content including a plurality of media fragments;
receive, by the client device, manifest data configured to enable the client device to request the media fragments;
transmit, by the client device, a request for a media fragment, the media fragment including a plurality of frames;
receive, by the client device, a portion of the media fragment, the portion of the media fragment including fewer than all of the frames of the media fragment;
track a received playback duration of the media content, the received playback duration of the media content including a first playback duration corresponding to the portion of the media fragment, the first playback duration being determined using a fragment index associated with the media fragment and a number of bytes for the portion of the media fragment, wherein the fragment index identifies frames, a reference hierarchy, and frame offsets for the media fragment;
determine that the received playback duration exceeds a threshold;
responsive to determining that the received playback duration exceeds a threshold, initiate, by the client device, playback of the frames of the portion of the media fragment without the media fragment being completely downloaded;
determine, by the client device, that downloading of the media fragment has terminated without the media fragment being completely downloaded;
identify, by the client device, frames of the media fragment not included in the portion of the media fragment; and
transmit, by the client device, a second request specifying a remainder portion of the media fragment that is less than the entire media fragment, the remainder portion of the media fragment including at least some of the frames of the media fragment identified as not being included in the portion of the media fragment.

11. The client device of claim 10 wherein the media fragment is characterized by a fragment duration, and wherein the threshold is below the fragment duration of the media fragment.

12. The client device of claim 10, wherein tracking the received playback duration of the media content includes monitoring one or more of a download buffer associated with a media player, an internal buffer of a demultiplexer associated with the media player, or an internal buffer of a decoder associated with the media player.

13. The client device of claim 10, wherein the one or more processors are further configured to:
- determine that downloading of the remainder portion of the media fragment has terminated without being completely downloaded;
- proceed with playback of the media fragment using only the frames of the portion of the media fragment; and
- proceed with playback of one or more subsequent media fragments after playback of the media fragment and without rebuffering the media fragment.

14. The client device of claim 13, wherein each of the frames of the media fragment corresponds to one of a plurality of frame types, each of the frame types being characterized by a set of frame dependencies, the plurality of frame types being characterized by a hierarchy of the frame types, and wherein the frames of the media fragment are grouped within the media fragment according to the frame types and ordered within the media fragment according to the hierarchy of the frame types, and wherein the frames of the portion of the media fragment do not include one or more of the frame types.

15. The client device of claim 13, wherein the one or more processors are further configured to modify time stamps associated with at least some of the frames of the portion of the media fragment to smooth out a temporal distribution of the frames of the portion of the media fragment during playback.

\* \* \* \* \*